Aug. 17, 1954 J. D. REID 2,686,679

UNIVERSAL SOUND REPRODUCING STYLUS

Filed April 30, 1949 11 Sheets-Sheet 1

INVENTOR.
JOHN DRYSDALE REID.
BY
Alden D. Redfield
Charles Marshall Hogan
ATTYS.

INVENTOR.
JOHN DRYSDALE REID.
BY Alden D. Redfield,
Charles Marshall Hogan,
ATTYS.

INVENTOR.
JOHN DRYSDALE REID.
BY
Alden D. Redfield.
Charles Marshall Hogan.
ATTYS.

UNIVERSAL SOUND REPRODUCING STYLUS

Filed April 30, 1949 11 Sheets-Sheet 4

INVENTOR.
JOHN DRYSDALE REID.
BY
Alden D. Redfield,
Charles Marshall Hogan,
ATTYS.

Aug. 17, 1954 J. D. REID 2,686,679

UNIVERSAL SOUND REPRODUCING STYLUS

Filed April 30, 1949 11 Sheets-Sheet 5

INVENTOR.
JOHN DRYSDALE REID
BY
Alden D. Redfield,
Charles Marshall Hogan,
ATTYS.

Aug. 17, 1954 J. D. REID 2,686,679

UNIVERSAL SOUND REPRODUCING STYLUS

Filed April 30, 1949 11 Sheets-Sheet 6

INVENTOR.
JOHN DRYSDALE REID.
BY
Alden D. Redfield.
Charles Marshall Hogan
ATTYS.

INVENTOR.
JOHN DRYSDALE REID.
BY
Alden D. Redfield,
Charles Marshall Hogan,
ATTYS.

Aug. 17, 1954 J. D. REID 2,686,679

UNIVERSAL SOUND REPRODUCING STYLUS

Filed April 30, 1949 11 Sheets-Sheet 8

INVENTOR.
JOHN DRYSDALE REID.
BY
Alden D. Redfield,
Charles Marshall Hogan,
ATTYS.

INVENTOR.
JOHN DRYSDALE REID
BY
Alden D. Redfield,
Charles Marshall Hogan,
ATTYS.

INVENTOR.
JOHN DRYSDALE REID.
BY
Alden D. Redfield.
Charles Marshall Hogan.
ATTYS.

INVENTOR.
JOHN DRYSDALE REID.
BY
Alden D. Redfield.
Charles Marshall Hogan.
ATTYS.

Patented Aug. 17, 1954 2,686,679

UNITED STATES PATENT OFFICE 2,686,679

UNIVERSAL SOUND REPRODUCING STYLUS

John Drysdale Reid, Cincinnati, Ohio, assignor to Avco Manufacturing Corporation, Cincinnati, Ohio, a corporation of Delaware Application April 30, 1949, Serial No. 90,716

10 Claims. (Cl. 274—38)

The present invention relates to phonograph needles and specifically to a revolutionary needle which has the unique capacity of successfully tracking the distinct types of grooves in standard disc sound records and "long playing" or fine groove records.

At the present time the availability of, and the strong business competition between the manufacturers of, three distinct types of record discs, has imposed a severe hardship on the consuming public in that no needle heretofore offered for sale has the capacity successfully to follow the distinct types of grooves used in these discs. A further burden has been imposed on the public by the absence of a turntable which can support all three types. It is believed that the device shown and claimed in my copending U. S. Patent application, Serial No. 78,949, filed in the U. S. Patent Office on March 1, 1949, now Patent No. 2,577,035, issued December 4, 1951, entitled "Universal Phonograph Turntable," and assigned to the same assignee as the present application and invention, successfully solves the turntable problem. The present invention has for its primary object the provision of a phonograph needle which can be successfully used in playing any one or all of the three major types of record discs.

A bitter competitive struggle is now in existence, involving the standard large-diameter 78 R. P. M. record disc, the long playing 33⅓ R. P. M. Columbia discs, and the seven-inch 45 R. P. M. RCA disc. No needle has heretofore been developed for use with all types of records.

The term "standard record discs" is hereinafter used to designate the large-groove 78 R. P. M. types. In accordance with present day practice, the so-called standard discs conform to the following specifications:

*United States*

88° groove angle
.006 inch width of groove
.0023 inch bottom radius of groove

*England*

88° groove angle
.0065 inch width
.0017 inch bottom radius

The following standards have been proposed:

*United States*

90° groove angle ±5°
.006 inch groove width minimum
.0025 inch groove radius±.0005 inch

*England*

87.5° groove angle ±2.5°
.0067 inch groove width
.00165 inch groove radius ±.00015 inch B. E. G. Mittell, in his informal lecture entitled "Commercial Disc Recording and Processing," delivered to the Radio Section of the Institute of Electrical Engineers, Great Britain, on December 9, 1947, printed by permission of the Institution of Electrical Engineers, Savoy Place, London, W. C. 2, states that present day English grooves vary from 95° with a .0023 inch bottom radius and a .0024 inch depth to a minimum of 86.5° with a .0015 inch bottom radius and a depth of .0029 inch. He also cites a 1936 English record put out by H. M. V. (DB2605, Side 1) which had a 96° groove with a bottom radius of .0025 inch and a depth of .0021 inch resulting in a width of .0067 inch. This was stated to be representative of the practice in 1936.

H. Courtney Bryson, in his book "The Gramophone Record," published in 1935 by Ernest Benn Ltd., London, states that the average groove was .006 inch wide and .0025 inch deep. He states that the depth of grooves varies from .0018 inch to .0035 inch, the average being .0025 inch. His Figure 35 shows a groove which is .006 inch wide and .0025 inch deep and has a 75° angle. At page 79 he states that the groove angle has been varied from 60° to 90° with the groove depth kept approximately .0025 inch by changing the bottom radius; that the practice has been to use a small bottom radius of about .0015 inch for 90° grooves and a wide bottom radius of .003 inch for 60° grooves. At page 80 are photographs of the cross-sections of four makes of records. Scaling these drawings would indicate as follows:

The Columbia records had groove angles of 95°, were .007 inch wide, and had a .0023 inch bottom radius.

The Decca grooves had an angle of 97°, were .007 inch wide, and had a bottom radius of .0025 inch.

The Regal paper records had a groove angle of 85°, a groove width of .0075 inch, and a bottom radius of .0035 inch.

The Polydor records had a groove angle of 90°, a groove width of .0075 inch and a bottom radius of .0023 inch.

It is understood that some 78 R. P. M. records have been sold in the United States with a groove angle of approximately 100°. The maximum record groove dimensions for standard record discs which would be encountered in practice at the present time are approximately as follows:

100° angle
.006 inch width
.0023 inch bottom radius

The dimensions of 33⅓ and 45 R. P. M. fine groove records used in present day practice are next considered. According to RCA Record Drawing No. P327117 dated December 13, 1948, the RCA record groove is held to a maximum width of .003 inch but may go down to a minimum of .0025 inch. Other dimensions of this groove are:

Included angle—85°±5°
Bottom radius—.00025 inch maximum
Lead out and eccentric grooves—same dimensions According to Columbia Drawing No. TD203 dated December 2, 1948, the groove width is held to a minimum of .0027 inch and is allowed to vary to a maximum of .0030 inch. Other dimensions are:

Groove angle—87°±3°
Bottom radius—.0002 inch maximum
Lead out groove and eccentric spiral—increased in depth to $$.003\text{ inch}{+.0005\text{ inch} \atop -.000}$$

making width .006 inch approximately.

In July 1948 I measured a group of six Columbia records and found that the groove width averaged .00277 inch but varied from .00211 inch (#2008, Side 2) to .00383 inch (#4028, Side 1).

It appears that the minimum width of fine groove records to be encountered in practice approximates .0021 inch. It will be understood, of course, that some fine groove record discs are designed for a speed of 78 R. P. M.

The above considerations have compelled the public to purchase at least two distinct types of needles and to go to the trouble of adjusting record players to place one or the other type of needle into operation, depending on the type of disc to be played. Some crystal cartridges are equipped with two needles, one of which becomes an undesired mechanically resonant system when the other is used. At best, such cartridges must be adjusted to select one needle or the other. Alternatively, consumers are forced to use one type of disc exclusively and are deprived of the use of the other types. These hardships have created a great amount of confusion, caution, and sales resistance on the part of the public and have contracted the market for record changers, record players, and combination radio-phonograph sets. Therefore the need for a universal-type phonograph needle is very urgent.

Accordingly, the primary object of the present invention is to provide a universal needle which accurately and faithfully follows the modulations of both standard and fine groove record discs.

The principal advantages flowing from the use of the invention are as follows:

(1) Operation is simplified in that turntable speed is the only variable which must be selected in accordance with the type of disc to be played;

(2) There is no necessity to replace a needle or vary the tilt or turn of a cartridge when selecting a different type of record disc;

(3) No tone-arm weight change is required;

(4) The stylus tracks all commercially-employed records, the 78 R. P. M. standard and fine groove types, the 45 R. P. M. fine groove type, and the 33 R. P. M. standard and fine groove types;

(5) The stylus reduces manufacturing costs of the phonograph as a whole, in that it eliminates one or more of a plurality of needles, tone-arm weight-changing levers, tone-arm cartridge bearings, certain amplifier stages and compensation networks;

(6) The stylus improves performance in that it is positively driven by both side walls of the groove;

(7) The stylus prevents damage and excessive wear such as record discs frequently suffered in the past by reason of the attempted use with one type of record of a needle suited for another type of record.

(8) The stylus rides high on all types of grooves encountered in practice, with the resultant advantages pointed out in my Patent 2,251,204. Since the width of the fine grooves is less than the width of the standard grooves, the areas of the conical stylus in accordance with the invention which contact the fine grooves are not co-extensive with the areas which contact the standard grooves. Stating the matter another way, the points of stylus contact with fine grooves are closer to the virtual apex of the stylus cone than are the points of stylus contact with the standard grooves. The construction in accordance with the present invention therefore increases the life of the stylus. This advantage flows not only from the differentials between wear areas attendant upon use with standard grooves and fine grooves, but also from the variances between wear areas involved among standard grooves of different dimensions or fine grooves of different dimensions. As stated above, even as among standard grooves or as among fine grooves there is a considerable variation in dimensions employed in practice. The wear which occurs in the stylus by reason of use with standard grooves does not impair its effectiveness for use with fine grooves, because the area of the cone which touches the wider standard grooves is not identical with the area which touches the narrower fine grooves.

The general objects of the invention are to achieve all of the aforementioned advantages.

In accordance with the invention I provide a reproducing stylus in the form of a cone having a wide angle apex. The angle defined by the apex is at least as great as the included angle of the largest groove to be tracked and is preferably 108°±½°, in the case of a circular-tip stylus, or 104°±½°, in the case of an elliptical stylus, for use with grooves having an included angle of less than 100°. The maximum apex angle is limited by the prohibition against sliding of the stylus in a direction transverse to the groove. The minimum apex angle is limited by the prohibition against stylus contact with the bottom of the groove having the greatest included angle. So far as I am aware, the present invention embraces the original and first conception of a wide-angle conical stylus for use with record discs of the different types mentioned above, or for use with both standard groove and fine groove record discs.

Also in accordance with one form of the invention, the conical section of the reproducing stylus is truncated and terminates in a surface of revolution tangent to the cone. The projection of this surface of revolution beyond the truncated portion of the cone or the cone tip must be sufficiently small to permit the tip to clear the bottom of the largest groove without critical tilting of the stylus. The radius of the cone tip is desirably sufficiently small that the chord across the truncated portion is smaller than the width of the smallest groove to be encountered. The present invention is believed to embrace the first and original conception of a wide angle conical stylus terminating in a tangent surface of revolution, the characteristics of which are defined by these two limitations. In the case of a circular stylus tip, for example, the maximum radius of the tip should be such that the chord formed between opposed points of tangency with the cone is smaller than the width of the smallest groove. If this radius is exceeded, the stylus tip arc rides on the smallest groove. Such a condition is permissible, so long as the radius is not so great as to permit sliding of the stylus out of such groove. The minimum radius of the circular tip is limited by the requirement, for a given cone angle, that the tip clear the bottom of the largest angle groove without critical tilting of the stylus. The concepts of the invention have been expressed in mathematical equations hereinafter set forth. Optimum results have been obtained with a circular tip radius of .0016 inch with a tolerance of ±.0002 inch.

The reproducing stylus as a whole may be tilted in a trailing or digging direction with respect to the groove in such a manner that a tip having an even smaller radius of curvature clears the bottom of the standard groove, but optimum results have been obtained with an angle of trail of 8°±4°. The characteristics of the largest angle groove are such that a decrease in the cone angle or tip radius requires an increase in the angle of trail and a decrease in the angle of trail or tip radius requires an increase in the cone angle, when assumed initial cone angle and angle of trail and radius are such that the stylus just clears the bottom of the groove of largest included angle.

It is believed that the present invention involves the first and original concept of a conical stylus which "rides high" in either a fine groove or a standard groove.

As stated in my U. S. Patent No. 2,251,204, issued July 29, 1941, entitled "Sound Reproduction" and assigned to the same assignee as the present application and invention, it has been found that the bottom portion of a record disc groove does not cut so cleanly as the upper part of the groove, greater pressure being required to cut the full depth and to push away the tailings. This factor causes the lower part of the groove to become irregular and imperfect. A reproducing stylus which follows the bottom part of the groove is affected by these irregularities, resulting in a loss of electrical response to the desired modulation, in increased distortion and response to undesired modulation. It might also be mentioned that records are often formed by the use of a stamper which presses a mass of moldable material into final form. The raised portions on the stamper are those which correspond to the bottom of the groove, and it is these raised portions which receive the greater wear during the manufacturing process and which are most subject to being marred or scratched during processing. Consequently every imperfection present upon the exposed surface of the stamper appears in exact replica at the bottom of the groove and thus aggravates the inherent irregularities of the bottom of the groove. The stylus of the present invention does not ride upon these irregular and imperfect portions, and the undesirable effects thereof are not present in the output of the reproducing device with which the universal phonograph stylus in accordance with the invention is employed.

For a better understanding of the present invention, together with other and further objects, advantages, and capabilities thereof, reference is made to the following description of the accompanying drawings, in which two illustrative preferred embodiments of the invention are described in detail.

Figure 3:
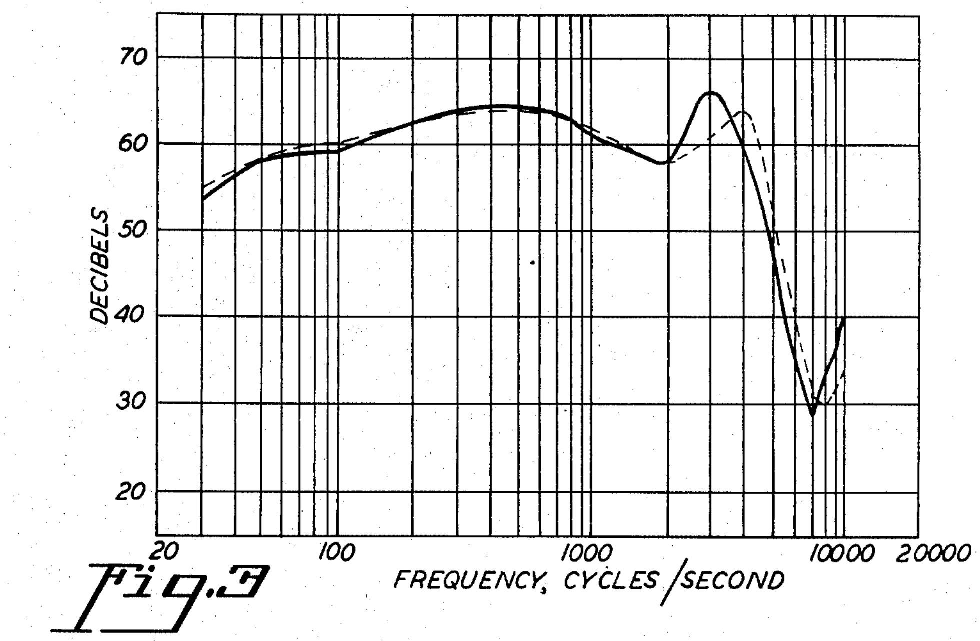
Figure 4:
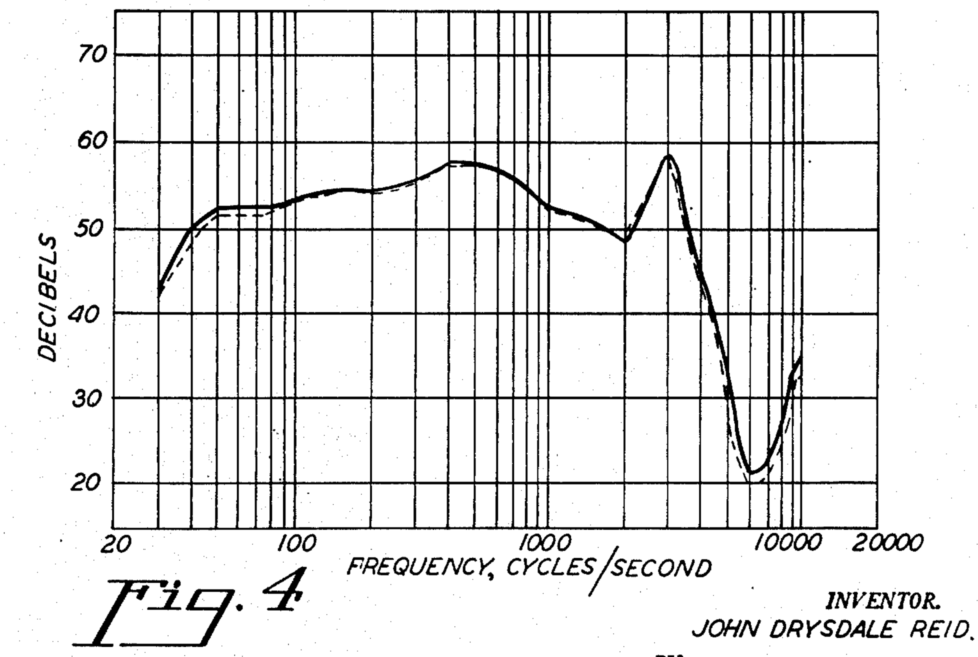
Figure 5:
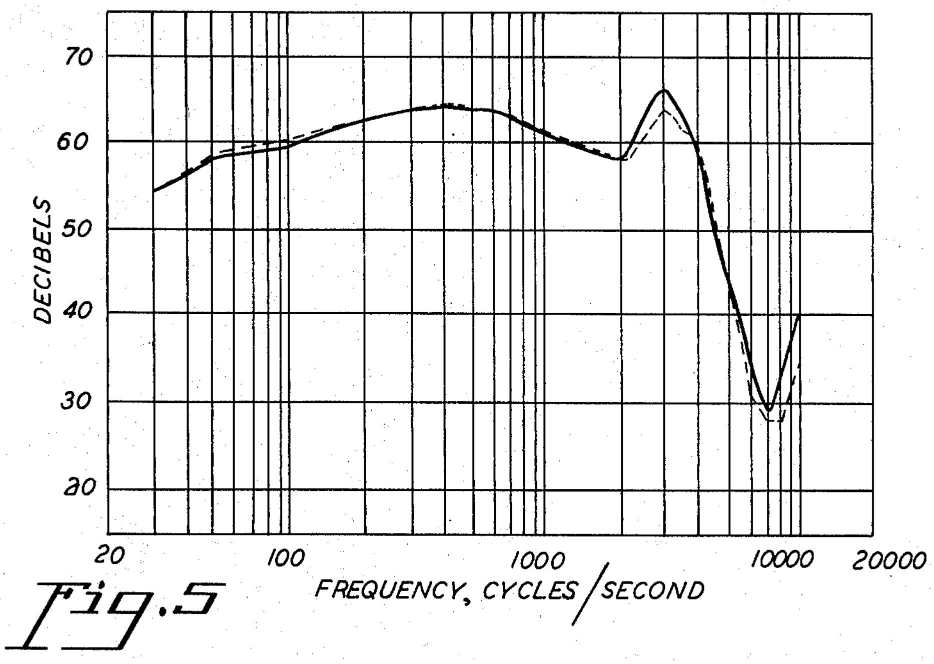
Figure 6:
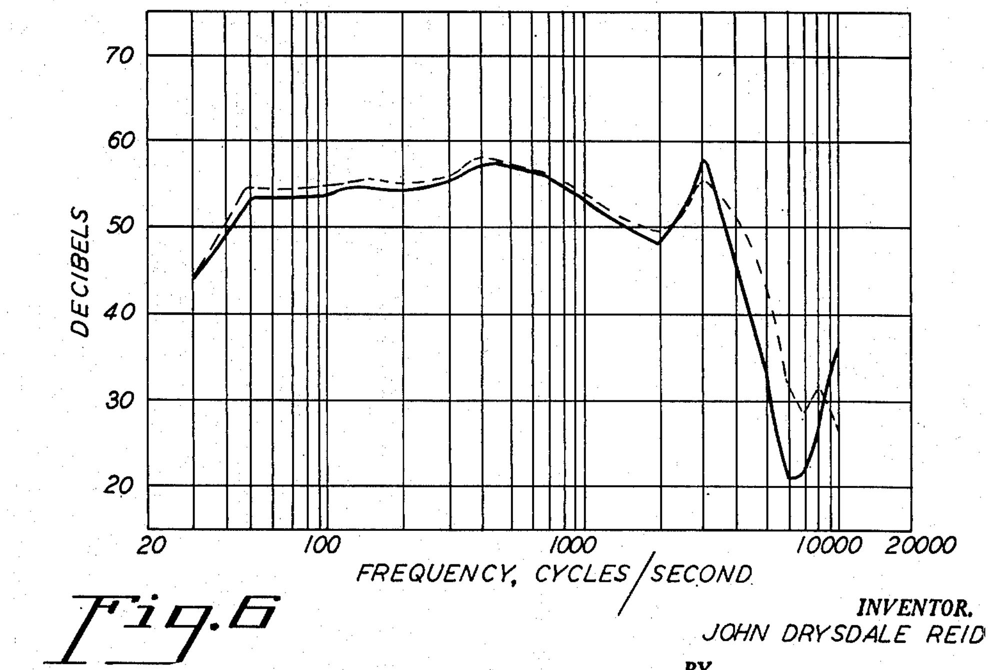
Figure 7:
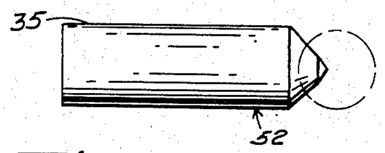
Figure 8:
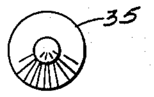
Figure 9:
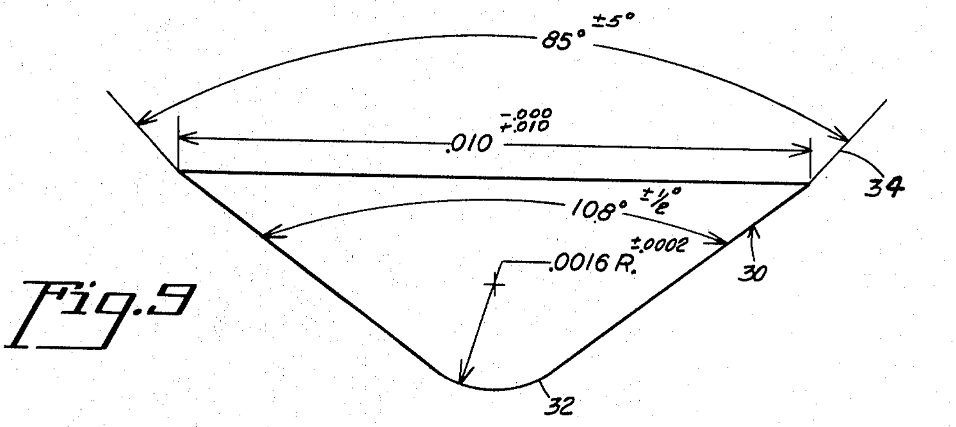
Figure 10:
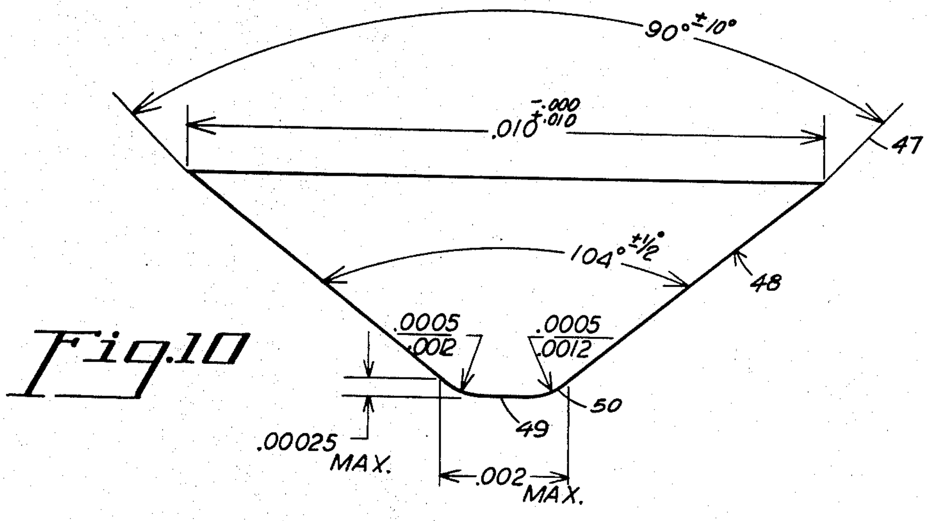
Figure 11:
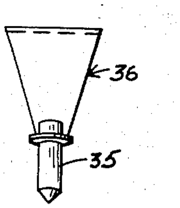
Figure 12:
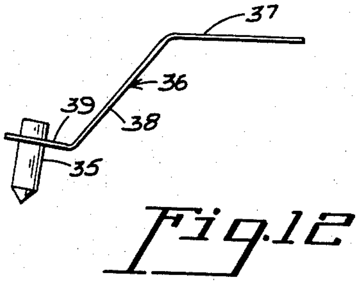
Figure 13:
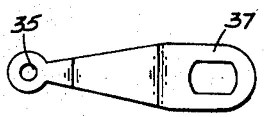
Figure 14:
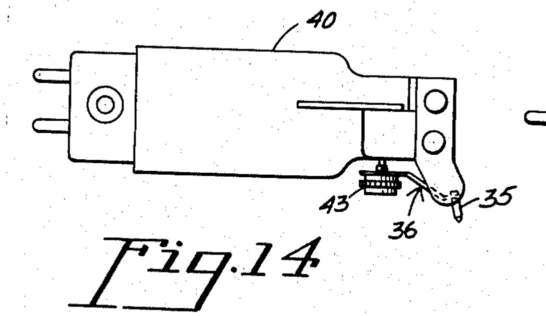
Figure 15:
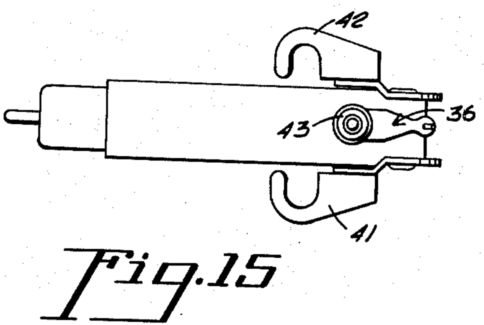
Figures 16, 17:
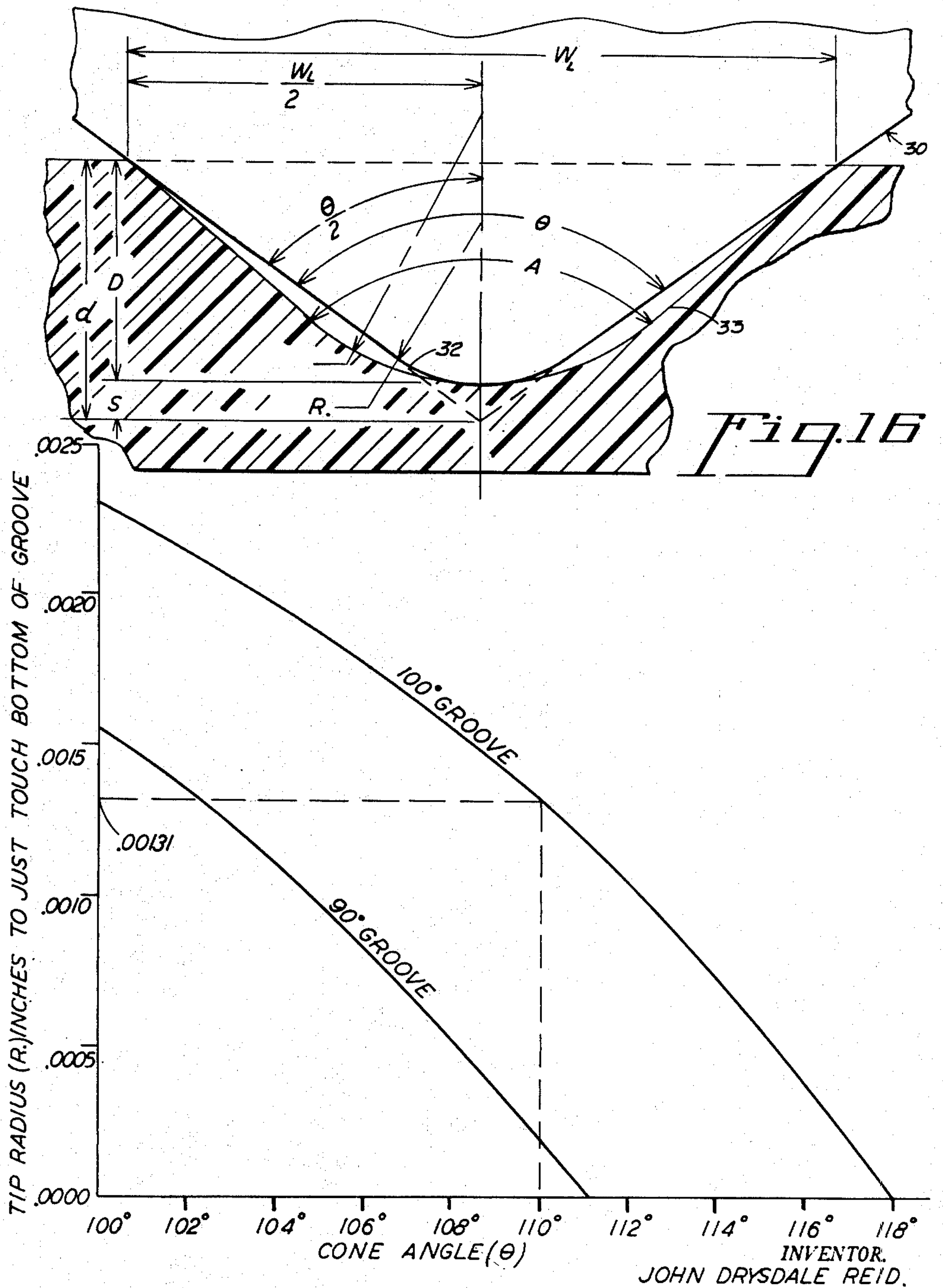
Figure 18:
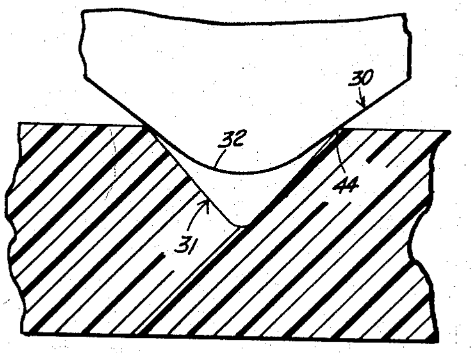
Figure 19:
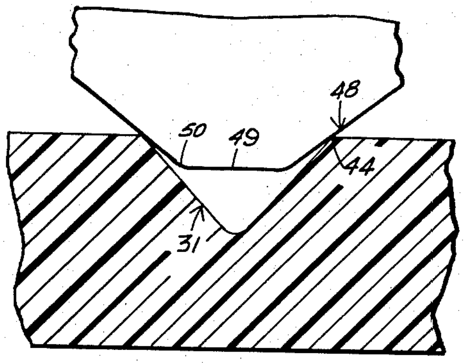
Figure 20:
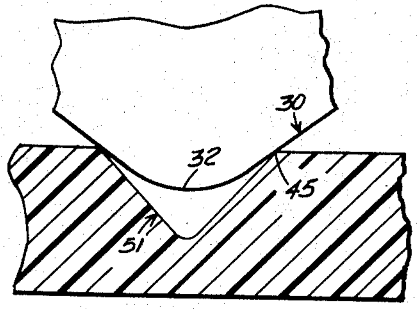
Figure 21:
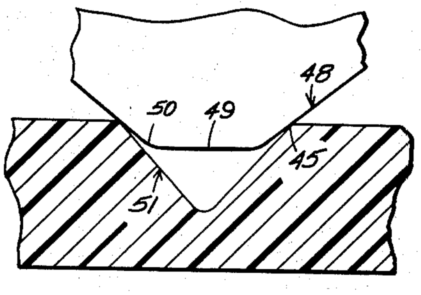
Figure 22:
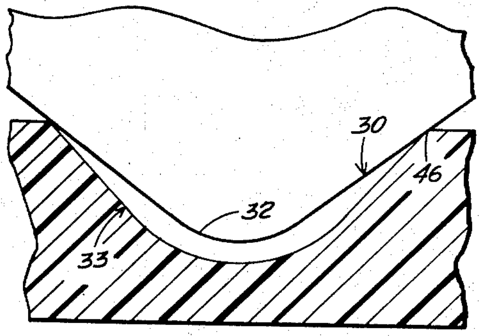
Figure 23:
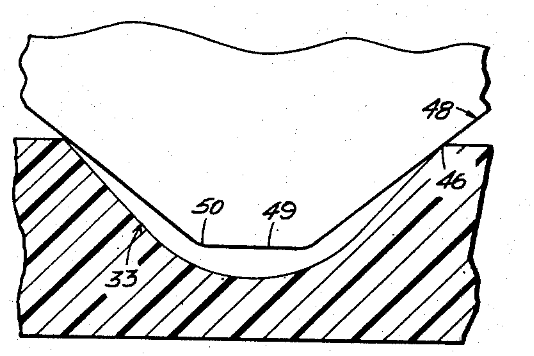
Figure 24:
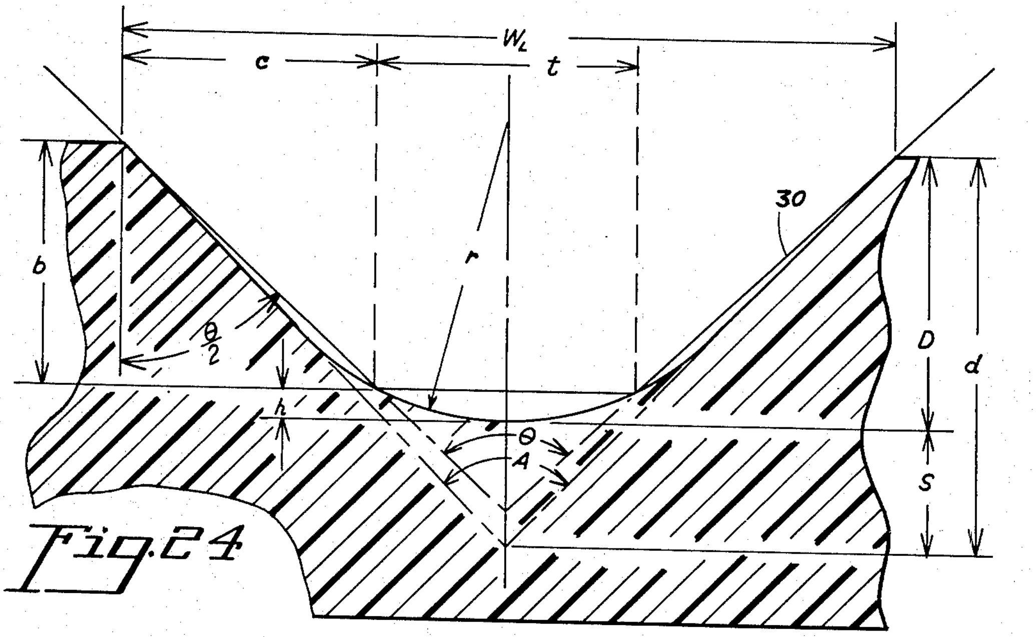
Figure 25:
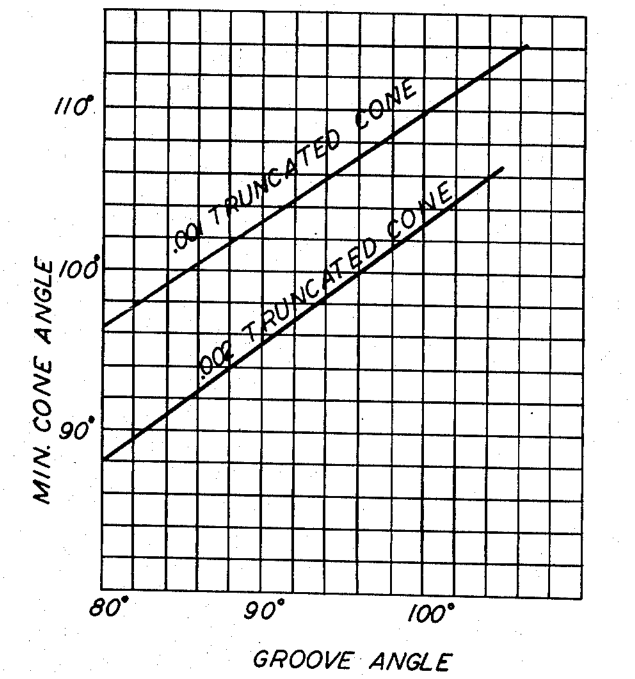
Figure 26:
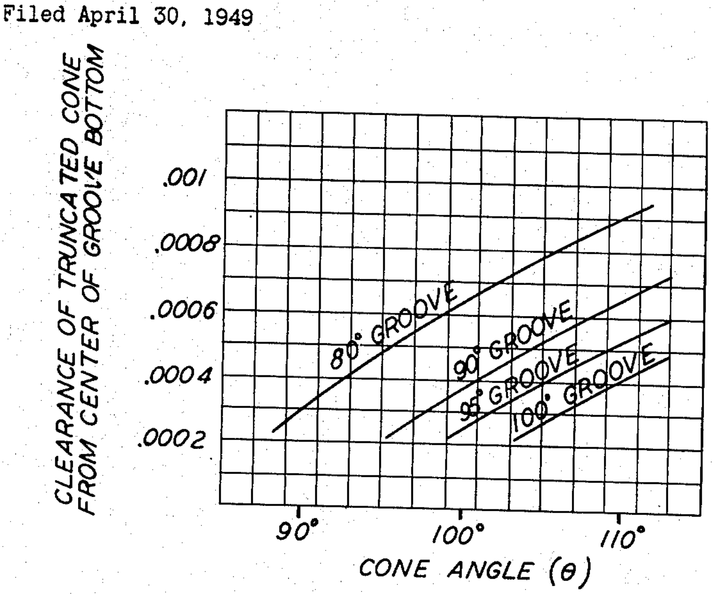
Figure 27:
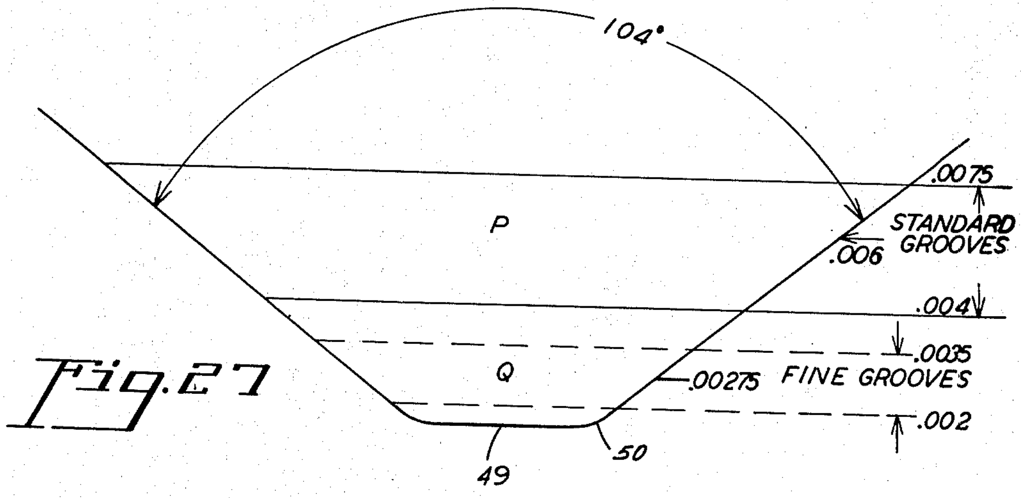
Figure 28:
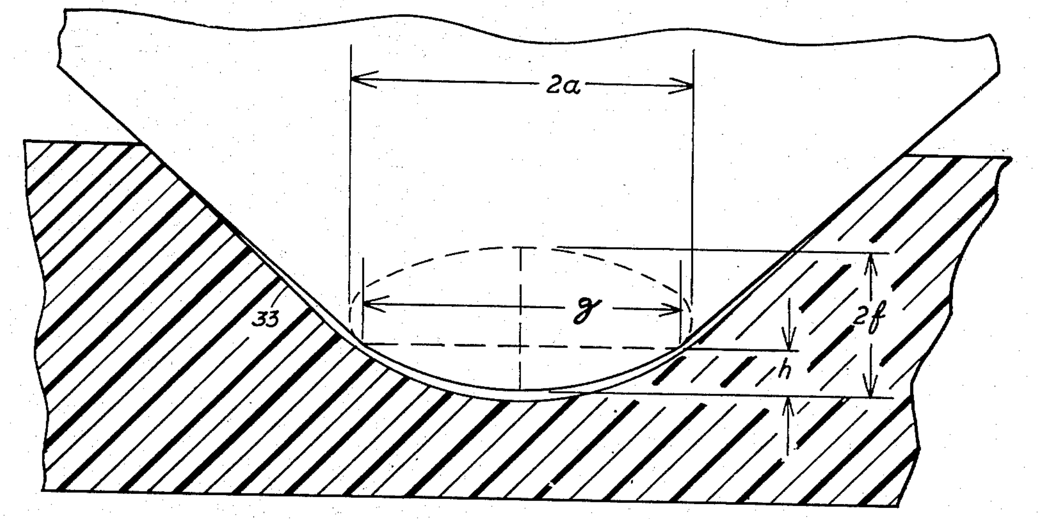
Figure 29:
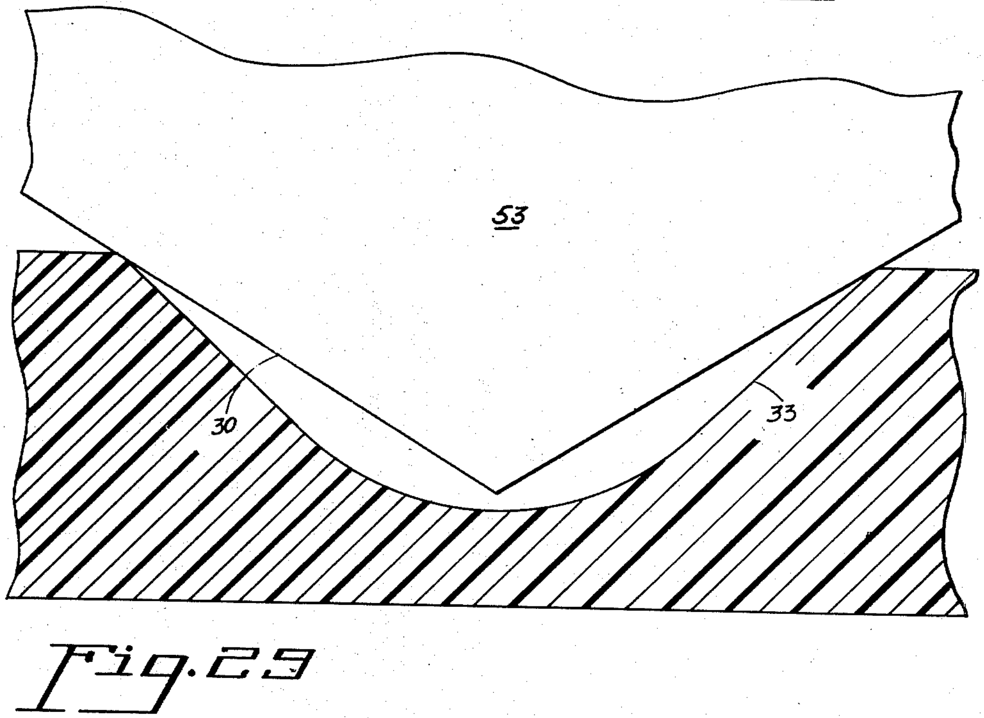

Fig. 3 is a set of curves comparing the characteristics of a stylus in accordance with the present invention (109° cone angle, .0016 inch tip radius) with those of a prior art stylus specially adapted for standard grooves only (.004 inch tip radius, 48° angle) and made in accordance with my said U. S. Patent 2,251,204, the response of both styli being plotted as ordinates against frequency as abscissae, when used with 78 R. P. M. standard groove records;

Fig. 6 is a set of curves comparing a stylus in accordance with the present invention (109° cone angle, .0016 inch tip radius) to a stylus specially adapted for fine grooves only, as to response characteristics, the response of both styli being plotted as ordinates against frequency as abscissae, when used with 33⅓ R. P. M. fine groove records;

Figs. 4 and 5 are sets of response (ordinates) versus frequency (abscissae) curves for a stylus in accordance with the invention (109° cone, .0016 inch tip radius), used with a 33⅓ R. P. M. fine groove record and a 78 R. P. M. standard record, respectively, showing the comparative effects of trail angles of 3° and 20°;

Figs. 7 and 8 are side and bottom (as seen from tip end) views of a stylus in accordance with the invention, the dimensions being so small that these views are generally applicable to the Figs. 9 and 10 embodiments;

Fig. 9 is a fragmentary elevational view of one form of the invention in which each axial section through the tip has a fixed radius, such tip surface being a portion of a sphere, each axial tip section being a portion of a circular arc, the specific embodiment shown having a cone angle of 108°±½° and a tip radius of .0016 inch±.002 inch;

Fig. 10 is a fragmentary elevational view of another form of the invention in which each axial section through the tip approximates a flattened ellipse, this embodiment having a cone angle of 104°±½° and radii which generate arcs tangent to the cone, such points of tangency being not more than .002 inch apart and not more than .00025 inch from the terminus of the tip;

Figs. 11 and 12 are front (looking from the point of view of an observer toward whom a record groove section is heading as it passes the stylus) and side views of a stylus assembly incorporating a stylus in accordance with the invention;

Fig. 13 is a bottom view of the stylus assembly;

Figs. 14 and 15 are side and bottom views of a suitable crystal cartridge and stylus assembly incorporating a stylus in accordance with the invention;

Fig. 16 is a graphical presentation showing geometrically the manner in which the functional relationship between cone angle, tip radius, and groove width is determined to prevent contact between the circular-type tip and the bottom of a standard groove;

Fig. 17 is a set of curves showing the relationship between radius (R) as ordinates and cone angle ($\theta$) as abscissae, for various standard groove widths ($W_L$);

Figs. 18 and 19 are elevational sectional views showing how the Figs. 9 and 10 styli fit into RCA fine grooves;

Figs. 20 and 21 are elevational sectional views showing how the Figs. 9 and 10 styli fit into Columbia fine grooves;

Figs. 22 and 23 are elevational sectional views showing how the Figs. 9 and 10 styli fit into standard grooves (.006 inch width, 88° groove angle, .0023 inch bottom radius);

Fig. 24 is a graphical presentation showing geometrically the manner in which the parameters of the elliptical-type tip are determined;

Figs. 25 and 26 are curves employed to explain the principles governing the Fig. 10 embodiment;

Fig. 27 is an enlarged view of the Fig. 10 embodiment showing the spacing between the wear areas for standard grooves and fine grooves;

Fig. 28 is an elevational view of an elliptical-tip stylus in accordance with the invention; and Fig. 29 is a fourth embodiment in which the cone actually converges to a real vertex.

Figure 1:
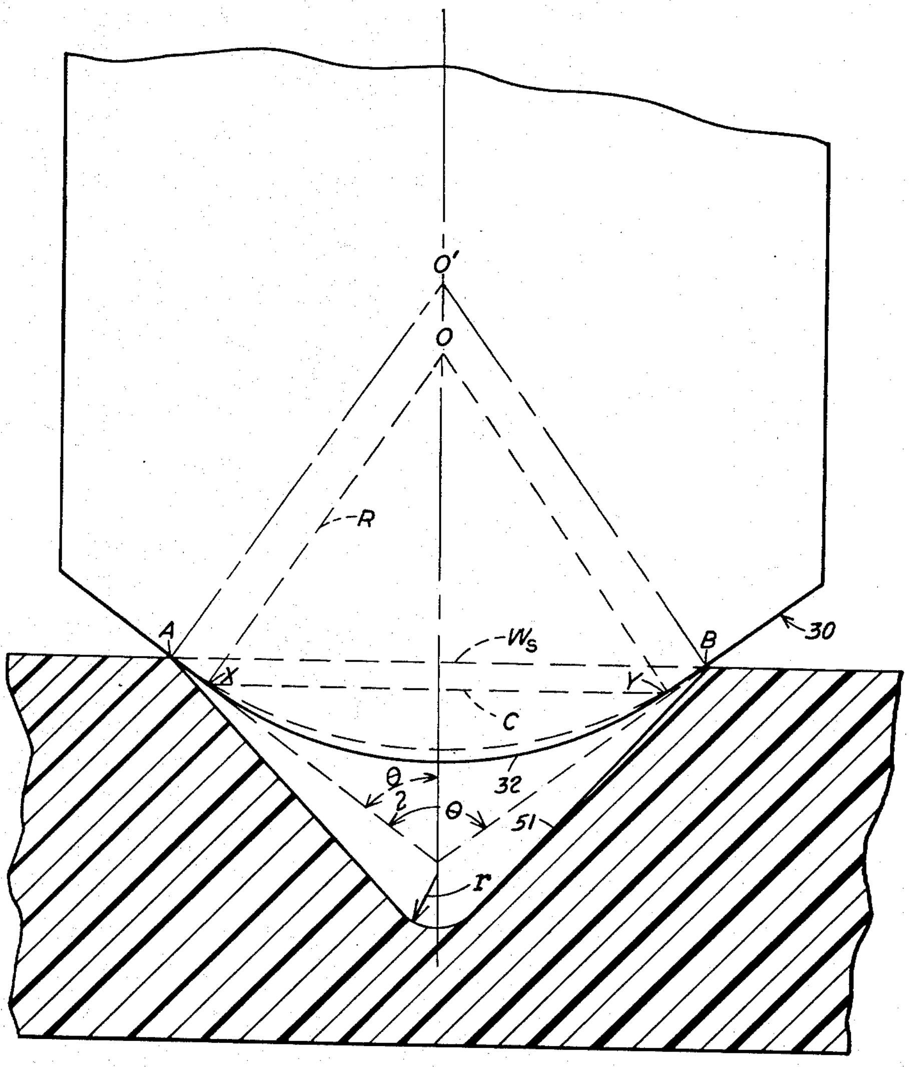
Fig. 1 is a geometrical presentation of the method by which the largest radius for the tip of a circular-tip stylus is computed, when it is desired to prevent the circular tip from riding on the shoulders of a fine groove.

In accordance with the invention there is provided a universal reproducing stylus for the reproduction of sound from any one of a plurality of record discs having laterally modulated grooves, these types being characterized by grooves of different widths and included angles, the stylus having a groove-contacting portion formed as a truncated cone having a virtual angle greater than the largest included angle of said grooves. In Figs. 9 and 10 two preferred embodiments of the invention are illustrated. In Figs. 28 and 29 two other embodiments are shown. Each of these embodiments has a groove-contacting portion formed as a truncated cone indicated generally by the reference numeral 30. Fig. 1, for example, is applicable to the Fig. 9 embodiment, and the cone portion, referring to Fig. 1, is truncated at the plane of the line XY. Generally the expressions "truncated" or "frusto-conical" are employed to describe a cone which has no vertex, apex, or tip. In this specification, however, those terms shall not be deemed to negative the presence of a tip. Each stylus has a virtual apex angle greater than the largest included angle of the grooves with which the stylus is to be used. For example, referring again to the Fig. 9 embodiment and the explanatory Fig. 1, the virtual apex angle $\theta$ is greater than the largest included angle of the 88° standard groove generally employed in the United States or the 85° RCA groove or the 87° Columbia groove. Since the Fig. 9 embodiment does not actually terminate in a vertex, but in fact terminates in a circular tip or spherical tip, the expression "virtual apex angle" or "virtual vertex angle" is employed to designate the angle $\theta$, for example, shown in Fig. 1. In the Fig. 29 embodiment, however, the actual vertex angle and the virtual vertex angle are identical, because the cone of that embodiment actually converges in a real apex.

The tip of the Fig. 9 embodiment is referred to as cylindrical or spherical, but it will be understood from an inspection of Fig. 1 that any section through the tip is bounded by a portion of the arc of a circle or sphere, and therefore this expression is herein used in that sense. The expression "curved tip" is intended to include a circular tip such as that shown in Fig. 9, or a tip having curved portions and a flattened end such as that shown in Fig. 10, or a tip having an elliptical contour such as that shown in Fig. 28.

The RCA types of record grooves are shown in Figs. 18 and 19 in section and indicated by the reference numeral 31. The Columbia type of groove is shown in Figs. 20 and 21 and indicated by the reference numeral 51. The U. S. standard record groove is generally indicated in Figs. 22 and 23 and indicated by the reference numeral 33.

The tip of each embodiment is sufficiently narrow that at least the major lower portion thereof can enter the groove of least width. Such tip is sufficiently short to clear the bottom of the groove having the largest included angle.

The Fig. 9 embodiment is first described in detail. It comprises a conical portion 30 which terminates in a circular tip 32. The surface of the tip is tangent to the surface of cone 30 and in continuity therewith. That portion of stylus 52 immediately above the truncated cone 30 is integral with a portion 34, having a lesser included angle than the cone, and portion 34 in turn is integral with a cylindrical body 35. Sapphire is a suitable material. The dimensions shown in Fig. 9 are to be taken as illustrations and not as limitations. A Fig. 9 embodiment having the following parameters was found to be entirely satisfactory:

Virtual apex angle—108°±½°
Tip radius—.0016 inch±.0002 inch

The considerations governing the construction of the Fig. 9 embodiment are described in the following discussion of the geometrical presentations shown in Figs. 1 and 16 and the curves of Figs. 2 and 17.

The expression "$W_s$" is hereinafter employed to designate the width of the smallest or most narrow groove which is employed or is likely in the future to be employed in commercial practice. That quantity approximates .0021 inch. It is desirable that the tip radius of the circular-tip type stylus provided in accordance with the present invention should be tangent to the sides of the stylus cone. Referring to any central section taken axially of the cone, it is desirable that the length of a chord drawn through the points of tangency between tip radius and cone sides be less than the width of the groove $W_s$. The tip radius is designated by the quantity R. The chord is designated by the quantity C. As stated, the quantity C should be smaller than the quantity $W_s$ in order to insure that the stylus will not ride on the arc or surface of the tip. Stating the requirement in another way, the tip radius should be sufficiently small that tangency between the cone angle and the tip radius occurs below the points of contact between the stylus and the top corners of the groove.

Referring now to Fig. 1, let the cone angle of the stylus be designated by $\theta$, the groove of least width by $W_s$, the tip radius by R, the points of tangency between tip radius and cone sides by X and Y, the chord between X and Y by C, and the points at which the cone touches the groove of least width by A and B. The points X and Y should be located below the points A and B. When C is equal to $W_s$, the following conditions must be satisfied:

$$\text{Angle } O'AB=\frac{\theta}{2}$$

$$\text{Cos}\,\frac{\theta}{2}=\frac{W_s}{2\underline{O'A}}$$

$$\underline{O'A}=\frac{W_s}{2\cos\frac{\theta}{2}}$$

$\underline{O'A}$ by construction is the tip radius which would make points XY and AB coincide. It follows that R, the tip radius, should be less than $$\frac{W_s}{2\cos\frac{\theta}{2}}$$

Stating the conditions another way, the chord formed by the radial arc drawn through the points of tangency between the tip arc and the cone sides must not be greater than the width of the smallest groove and should be smaller. It will be understood that so long as the chord drawn through these points of tangency satisfies this requirement, the surface of revolution between all tangent points X and Y may be circular or elliptical. A flattened ellipse is also satisfactory. The projection of the ellipse, outwardly from the chord, toward the bottom of the groove is of course limited by the requirement that the projection clear the bottom of the standard groove. A "flattened elliptical" type tip is shown in Fig. 10, hereinafter described in detail. It has been ascertained that optimum results are obtained with a stylus having a tip radius of .0016 inch ±.0002 inch, in the Fig. 9 embodiment.

Figure 2:
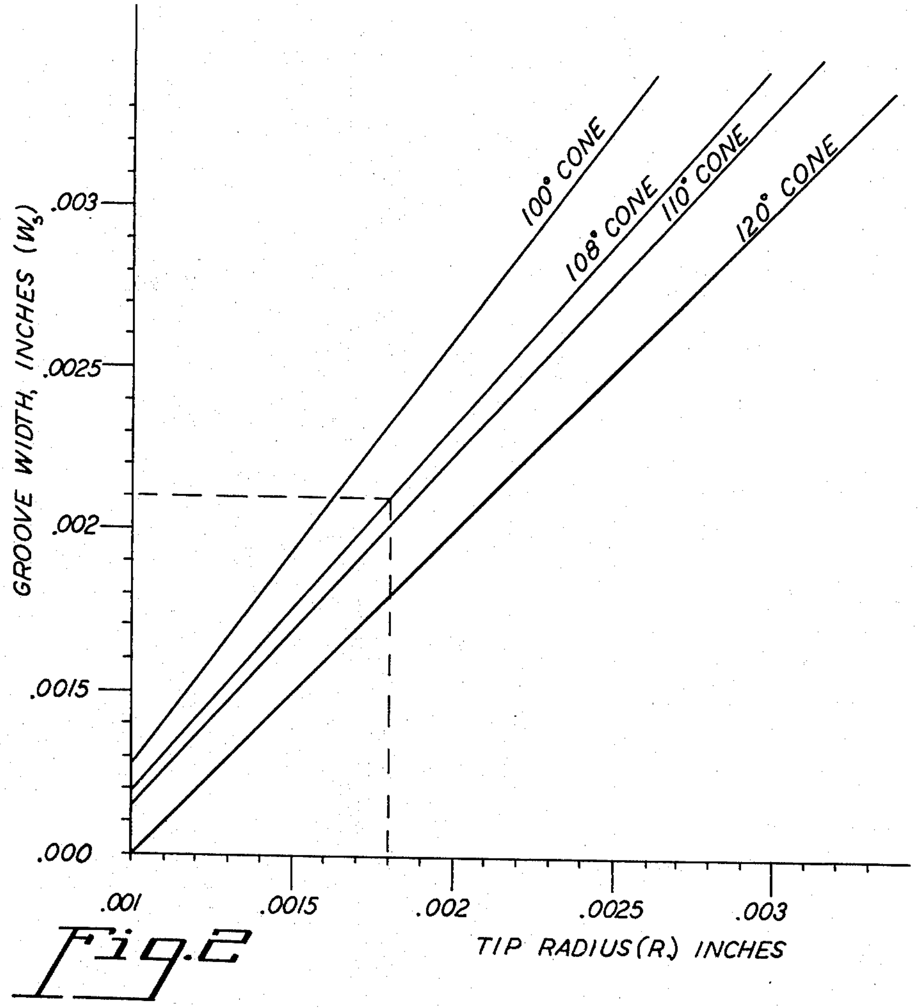
Fig. 2 is a set of curves showing the relationship between maximum radius (R), as abscissae, and groove width ($W_s$), as ordinates, for conical styli having apex angles of 100°, 108°, 110°, and 120°, when it is desired to prevent the circular tip from riding on the shoulders of a fine groove.

Referring to Fig. 2, it will be seen that a stylus with a cone angle of 108° and a tip radius of .0018 inch strikes the corners of a groove .0021 inch wide just at the point of tangency between the cone sides and the stylus arc. Since the stylus arc presents a lesser sliding angle than the cone to which it is tangent, so far as the groove is concerned, it is desirable from the tracking standpoint to play the groove of least width without riding on the tip radius. From the standpoint of mathematical theory, the tip of the needle could be sharply cut off immediately below the section at which it contacts the sides of the smallest groove. This practice is not approved, however, because any sidewise tilting of the needle or the groove would cause the sharp corners of the cut-off needle to bear against the groove. However, an elliptical tip is not subject to this limitation, and it has the advantage of increased clearance between the stylus tip and the bottom of a standard groove, if a given cone angle be assumed. Similarly, if a given clearance be assumed, the elliptical tip has the advantage that a smaller cone angle may be employed for the same clearance from the bottom of the standard or larger groove.

The expression $\theta$ is hereinafter employed to designate the cone angle. The expression $W_L$ indicates the width of the largest groove which is employed or is likely in the future to be employed in commercial practice. That quantity generally approximates .006 inch. Let the depth of the groove be indicated by the quantity D. When the cone angle is larger than the angle of the groove, the cone in mathematical theory touches the groove at its top corners. Let $d$ equal the vertical distance between those top corners and the extreme tip of the cone as geometrically projected. I have worked out a mathematical formula, in the case of a cone with a radial tip, for the minimum radius which must be provided in order to prevent the tip of the cone from touching the bottom of the groove. This mathematical formula is accurate under the following circumstances: (1) the cone angle must be greater than the angle of the groove; (2) the cone angle may be such that if geometrically projected into an imaginary conical tip and terminated in such a tip, the tip would touch or project below the bottom of the grooves, as shown in Fig. 16. Referring now to Fig. 16, let S be the distance between the bottom of the groove and the geometrically projected tip of the cone. Under these conditions the following mathematical expressions are true:

$$\frac{W_L}{2d}=\tan\frac{\theta}{2}$$

$$d=\frac{W_L}{2\tan\frac{\theta}{2}}$$

$$\frac{R}{R+S}=\sin\frac{\theta}{2}$$

$$S=R\left(\frac{1-\sin\frac{\theta}{2}}{\sin\frac{\theta}{2}}\right)$$

$$D=d-S=\frac{W_L}{2\tan\frac{\theta}{2}}-R\left(\frac{1-\sin\frac{\theta}{2}}{\sin\frac{\theta}{2}}\right)$$

$$R=\left(\frac{W_L}{2\tan\frac{\theta}{2}}-D\right)\left(\frac{\sin\frac{\theta}{2}}{1-\sin\frac{\theta}{2}}\right)$$

It will be understood, therefore, that when the tip is a circular arc, the radius which should be provided at the tip of the cone in order to prevent the cone from touching the bottom of the groove of the standard type of record disc should exceed the expression on the right side of the equation, which expression is stated in terms of cone angle, groove depth, and groove width. It will be understood that by tilting the cone in a trailing direction a smaller radius than that indicated in the formula may be used, since the clearance factor increases with tilt. That is, if a radius be taken centrally of the cone, the trace of such radius on the vertical plane, by reason of the trail of the stylus, is in effect elliptical.

In Fig. 17 there is shown a graph of cone angle against required tip radius, the tip being circular. It will be seen that the cone angle and tip radius are functionally related. The larger the cone angle, the smaller the tip radius which may be permitted. The smaller the cone angle, the larger the tip radius which is required. The considerations mentioned in the analysis of Figs. 17 and 16 show how the smallest permissible tip radius is arrived at. The considerations discussed in connection with Figs. 1 and 2 show how the largest permisisble tip radius is arrived at. Referring again to Fig. 17, it will be seen that a stylus having a cone angle of 110° just touches the bottom of a 100° groove when a tip radius of .00131 inch is provided.

Thus it will be seen that the invention provides a reproducing stylus (Fig. 9) for the reproduction of sound from a plurality of distinct types of record discs having laterally modulated grooves, these types being characterized by grooves 51, 31, and 33 (Figs. 18, 20, 22) of different widths and included angles, said stylus having a groove-contacting portion, formed as a truncated cone 30 having a virtual apex angle $\theta$ greater than the largest included angle of said grooves, and a tip portion 32 formed as a surface of revolution tangent (see R, Fig. 1) to the surface of said cone, the radius of said tip being less than $$\frac{W_s}{2\cos\frac{\theta}{2}}$$

(see Fig. 1) and greater than $$\left(\frac{W_L}{2\tan\frac{\theta}{2}}-D\right)\left(\frac{\sin\frac{\theta}{2}}{1-\sin\frac{\theta}{2}}\right)$$

(see Fig. 16).

In addition to the specific aspects defined by these mathematical expressions, the invention has broader aspects now to be discussed.

Referring now to Fig. 29, which shows a standard groove 33 and a conical needle 53 converging to a real vertex, it will be seen that a very large included cone angle permits the cone to clear the bottom of a large groove even though no curved tip is provided. As shown in Fig. 17, for example, a 118° conical stylus requires no curved tip and can converge to a real vertex when used with a 100° groove of .006 inch width having a bottom radius of .0023 inch. Similarly, a 112° conical stylus requires no curvature on the tip when used with a 90° groove having a bottom radius of .0023 inch and a width of .006 inch. Each of the preferred forms of the invention shown in Figs. 9 and 10 includes a curved tip or a tip having curved areas. The advantage of these two preferred forms is that they may have smaller included angles than the Fig. 29 embodiment, and they therefore resist more strongly forces tending to make the stylus slide transversely out of a record disc groove. When the curved tip is omitted, a larger stylus cone angle must be employed. This cone angle may, of course, be reduced by introducing a trail angle or so inclining the whole stylus that its central axis leans toward the groove portion which is, during rotation of a record disc, just approaching the stylus. It may, as indicated, be reduced by providing a circular tip, as shown in Figs. 1, 2, and 9. It may be still further reduced by providing a blunted tip surrounded by curved areas, as shown in Fig. 10, such tip being broadly referred to as a "flattened ellipse." It will be noted that one illustrative successful Fig. 10 stylus has a cone angle 4° smaller than one illustrative successful Fig. 9 stylus. As shown in Fig. 28, a true elliptical needle may have a cone angle which is smaller than that of the Fig. 9 embodiment.

Figs. 10, 28, and 29 indicate that the invention in its most generic aspects embraces:

(1) A stylus having a conical portion or equivalent formed with a large included angle than the groove having the largest included angle; or (2) A stylus having such a conical portion or equivalent, and either tilted as a whole or so formed with a very wide angle or with a circular, elliptical, or partially curved and blunted tip as to clear the bottom of the groove having the largest included angle; or (3) A stylus having such a conical portion or equivalent and an integral tip, the tip being sufficiently narrow that at least the major portion thereof can enter the groove of least width (in Fig. 1 the whole tip enters such groove) and sufficiently short to clear the bottom of the groove having the largest included angle.

Referring now to Figs. 11, 12, and 13, it will be seen that a stylus in accordance with the invention may be mounted as by press fitting in a spring 36 of suitable character, such spring not being per se a part of the present invention. The spring may have an upper horizontally extending portion 37, an intermediate downwardly sloping portion 38, and a lower generally horizontally extending portion 39, apertured to receive the cylindrical portion 35 of the stylus. The stylus assembly including the spring 36 is mounted on a suitable crystal cartridge 40, in conventional fashion. The cartridge may be provided with wings 41 and 42 for mounting purposes. The spring is secured to the under side of the cartridge as by a knurled adjustment screw 43. A cartridge per se is not part of the present invention, although the invention makes practicable the use of a single cartridge, the tilt of which does not have to be adjusted to bring one of a plurality of specialized needles into contact with the different types of grooves for which such needles are specially designed.

Referring now to Figs. 3 and 6, Fig. 3 shows the response curves of a Fig. 9 type of universal stylus as compared to a specialized type of needle which is suitable for standard grooves only. The full line curve indicates the performance characteristics of the universal type of stylus provided in accordance with the invention, and the dashed line the performance characteristic of a needle which is "tailor-made" for 78 R. P. M. records having standard grooves. It will be seen that the performance of the universal type needle which this invention provides is substantially identical to that of a needle which is tailor-made for a standard groove alone.

The grooves in Fig. 6 illustrate the comparative performance characteristics of a universal type needle in accordance with Fig. 9 and a special needle which is optimized for the Columbia 33⅓ R. P. M. fine groove type of record disc, the full line indicating the response of the universal type of stylus provided by this invention, and the dashed line indicating the performance of a needle which is optimized for and limited to use with the Columbia or other type of fine groove record. Again the performance is substantially identical. In fact, the variations as between the two curves shown in Fig. 3 and those as between the two curves shown in Fig. 6 are accounted for by extraneous factors rather than by the stylus contour. The result is surprising in that the universal type of needle which this invention provides performs equally as well as either of the two "tailored-made" and optimized types. In Figs. 3 and 6 response in decibels is plotted as ordinates against audio-frequency as abscissae.

It will be recognized that the relationship between the central axis of an installed needle and the true vertical varies in accordance with the thickness of a stack of records on the record player with which the needle is employed. It is preferred, but not essential, that a small trailing angle be introduced under the condition when one record only is on the turntable. The response curves in Fig. 4 show the effect of this trailing angle on the frequency response of the Fig. 9 type of needle, the full line curve showing the performance characteristic when the trailing angle is 3° lagging behind the vertical, and the dashed line showing the performance characteristic when the trailing angle is 20°. The Fig. 4 curves were taken with a Fig. 9 stylus and a 33⅓ R. P. M. Columbia fine groove record disc. The curves in Fig. 5 were taken with a 78 R. P. M. standard groove disc with a Fig. 9 stylus. The full line indicates the response characteristic with a trailing angle of 3° and the dashed line the response characteristic with a trailing angle of 20°. It will be apparent to the observer that the height of a record stack does not vary within sufficiently wide limits to introduce undesired performance characteristics in that the two curves in Fig. 4 are substantially alike, as are also the two curves in Fig. 5. In fact, as indicated above, an angle of trail may properly be introduced. Similarly, an angle of lead may be employed in certain cases where the record disc material is such that the stylus will not dig into it.

The Fig. 10 embodiment is now described. It is explained in terms of requirements illustrated in Figs. 24, 25, and 26. I have shown and described the circular tip type and shall now describe the flattened and elliptical tips.

Any stylus must ride on at least two spaced points or areas properly to follow the modulation. This requirement is satisfied by all embodiments of the invention. The stylus must avoid contact with the bottom of the groove having the largest angle. Let it be assumed that an imaginary stylus cone is actually sharply truncated and has no tip. In such case, $$h=D-\frac{W_L-t}{2\tan\frac{\theta}{2}}$$

when $h$ is the clearance between the center of the bottom of the frustum and the groove bottom (Fig. 24), $W_L$ is the width of the widest groove used in practice, D is the depth of such groove, $\theta$ is the cone angle, and $t$ is the width of the cone at the plane where it is truncated.

This expression is derived as follows:

$$h=D-b,\ \tan\frac{\theta}{2}=\frac{c}{b}$$

$$b=\frac{c}{\tan\frac{\theta}{2}},\ h=D-\frac{c}{\tan\frac{\theta}{2}}$$

$$h=D-\frac{W_L-t}{2\tan\frac{\theta}{2}}$$

where $b$ is the vertical component of the distance and $c$ is the horizontal component of the distance between the point of cone contact with the groove shoulder and the nearest corner of the truncated cone.

The value of $h$ is plotted in Fig. 26, assuming a standard groove showing a width of .006 inch and a bottom radius of .0023 inch, and also assuming that the cone is .002 inch in width at the plane of truncation. $h$ is plotted as ordinates against cone angles as abscissae, for a number of groove angles. It will be noted that, for a given cone angle, the clearance increases as the groove angle decreases. For a given clearance, the cone angle must increase as the groove angle increases.

Now if a tip be provided on such truncated cone, the maximum projection of the tip beyond the plane of truncation must be less than the quantity "$h$." In other words, such projection must not exceed $$D-\frac{W_L-t}{2\tan\frac{\theta}{2}}$$

I have therefore shown the limitation of such projection in terms of width of the largest-angle groove, depth of such groove and width of the cone at the plane of truncation. Now such tip can be circular, as shown in Fig. 9, or it can be flattened, and surrounded by a curved area as shown in Fig. 10, the effective over-all curvature of Fig. 10 tip being greater than that of the Fig. 9 tip. Also, the tip can be elliptical, as shown in Fig. 28. I have shown how $h$ is limited and shall now discuss how the minimum cone angle is limited.

The stylus according to the invention always rides on the upper groove shoulders. It will be apparent that, if a given cone width at the plane of truncation and a given groove angle and bottom radius and depth be assumed, then by decreasing the cone angle there will be attained a cone angle such that the corners of the cone at the plane of truncation touch the lower portion of the widest-angle groove. This cone angle at which any cone section rides on four points of the groove is called the critical angle. The cone angle must not be less than the critical angle, because a lesser cone angle would cause the stylus to ride completely on the curved portion of the groove bottom.

The expression for the critical cone angle is derived from Fig. 24 as follows:

$$r^2=\frac{t^2}{4}+(r-h)^2$$

$$r-h=\sqrt{r^2-\frac{t^2}{4}}$$

$$h=r-\sqrt{r^2-\frac{t^2}{4}}$$

$$b=D-h=D-r+\sqrt{r^2-\frac{t^2}{4}}$$

$$c=\frac{W_L-t}{2}$$

$$\tan\frac{\theta}{2}=\frac{c}{b}=\frac{W_L-t}{2\left(D-r+\sqrt{r^2-\frac{t^2}{4}}\right)}$$

$$\text{arc tan}\ \frac{W_L-t}{2\left(D-r+\sqrt{r^2-\frac{t^2}{4}}\right)}=\frac{\theta^1}{2}$$

where $\theta^1$ is the critical angle, $r$ is the radius of the groove bottom, $t$ is the width of the cone at the plane of truncation, $h$ is the clearance between the center of the cone at the plane of truncation and the bottom of the groove, $D$ is the groove depth, $c$ and $b$ are, respectively, the horizontal and vertical distances between the groove shoulder and the point of contact between the cone and the groove at the plane of truncation, and $W_L$ is the width of the groove having the largest included angle.

The curves of Fig. 25 show groove angle as abscissae plotted in a frame of Cartesian coordinates against critical stylus cone angles as ordinates, for cones actually truncated and having widths of .001 inch and .002 inch at the plane of truncation. It will be observed that the critical angle increases as the groove angle increases. It will also be noted that, for a given groove angle, the critical cone angle decreases as the width of the cone at the plane of truncation increases. These curves are based on the so-called "standard groove."

In practice, an actually truncated cone is not employed. As shown in Figs. 10, 19, 21, 23, and 27, the cone is virtually truncated but is provided with a tip projecting beyond the plane of truncation. Therefore the critical angle is at least slightly exceeded in practice. In the Fig. 9 embodiment, wherein a circular tip is provided, the critical angle is considerably smaller than the actual cone angle. If an actually truncated cone were used, then the critical angle could be substantially equal to the cone angle, neglecting for the moment the undesirable effects of sharp edges bearing against the groove. Between the extremes of a circular tip (Fig. 9) and no tip at all (Fig. 24) are a "flattened-elliptical" tip (Fig. 10), in which the cone angle must be slightly larger than the critical angle and can be considerably larger, and a true elliptical tip (Fig. 28) in which the cone angle must be slightly larger than the critical angle but not so much larger as in the case of a circular tip.

It will be seen that the invention provides a stylus having a virtually truncated conical portion formed with an included angle $\theta$ in excess of twice the angle whose tangent is equal to $$\frac{W_L-t}{2\left(D-r+\sqrt{r^2-\frac{t^2}{4}}\right)}$$

said conical portion terminating in an integral tip which projects beyond the plane of truncation by an amount less than $$D-\frac{W_L-t}{2\tan\frac{\theta}{2}}$$

the width of the cone at the plane of truncation being less than $W_s$, where $W_L$=width of largest-angle groove for which the stylus is designed,
$t$=width of cone at plane of truncation,
$r$=bottom radius of groove having width $W_L$,
$\theta$=cone angle
$W_s$=width of smallest-angle groove for which the stylus is designed, and
$D$=depth of a groove having width $W_L$, said tip surface being tangent to the surface of said conical portion.

As stated above, it is desirable that the width of the virtual plane of truncation be less than $W_s$. It is within the teachings of the generic invention to permit the curved tip to ride on the upper shoulders of the narrowest groove, but in the preferred species of the invention the tip fits below those shoulders.

The value of D is derived as follows:

$$\frac{W_L}{2d}=\tan\frac{A}{2}$$

$$d=\frac{W_L}{2\tan\frac{A}{2}}$$

$$\frac{r}{r+s}=\sin\frac{A}{2}$$

$$S=r\left(\frac{1-\sin\frac{A}{2}}{\sin\frac{A}{2}}\right)$$

$$D=d-S=\frac{W_L}{2\tan\frac{A}{2}}-r\left(\frac{1-\sin\frac{A}{2}}{\sin\frac{A}{2}}\right)$$

The groove depth is thus defined in terms of $W_L$, the width of the largest-angle groove, A, the groove angle, and $r$, the bottom radius.

Figs. 18, 20, and 22 are sectional views indicating how the Fig. 9 embodiment of the stylus having a circular type tip in accordance with the invention rides in an RCA type fine groove, a Columbia type fine groove, and a standard groove, respectively. It will be noted that in each instance the tip is below the upper shoulders of the groove, such shoulders bearing the reference numerals 44, 45, and 46, respectively. In each case, the outer surface of the conical portion of the stylus rides on the shoulders. It will be understood that in practice the record disc material always yields somewhat so that the stylus contact at the groove shoulders is area contact rather than point contact.

Figs. 19, 21, and 23, respectively, show how the Fig. 10 embodiment of stylus fits within the RCA fine groove, the Columbia fine groove, and the standard groove, respectively. Again, in each case, the tip is below the upper shoulders of the groove, and there are areas of contact between the cone and those shoulders.

The Fig. 10 embodiment is also shown in detail in Figs. 19, 21, 23, and 27. The dimensions given are illustrative. The Fig. 10 stylus comprises an upper conical portion 47 having an included angle of 90°, which upper portion tapers into a lower truncated conical groove-contacting portion 48, and the groove contacting portion terminates in a tip 49. In this case the groove-contacting conical portion has an illustrative included angle of 104°±½°. The extreme end of the tip is flattened. The flat portion of the tip is bounded by a curved surface which may have a generating radius between .0012 inch and .0005 inch. This radius is tangent to the surface of cone 48 at a plane removed from the plane of the blunted portion of the tip by .00025 inch maximum. The distance between opposed points of tangency is .002 inch maximum in the illustrative embodiment shown. In other words, the blunt flat surface 49 is surrounded by a curved surface 50 so that the tip is effectively a flattened ellipse. Since a flattened ellipse projects from the vertical truncated cone by an amount less than the arc of a circle, tangency between tip and cone being assumed, and a given width of cone at the plane of truncation being assumed, the cone angle for the Fig. 10 embodiment need not be so large as the cone angle for the Fig. 9 embodiment.

Referring now specifically to Fig. 27 of the drawings, and using the Fig. 10 embodiment as an example, it will be apparent that the wear areas, that is, the areas of contact between stylus and grooves, are different for standard grooves than for fine grooves. Such areas are not co-extensive and in fact they are spaced. The zone Q indicates the area of stylus contact with fine grooves, and zone P indicates the area of contact with standard grooves. Since these zones are not the same, stylus life is enhanced by reason of the diversity of the dimensions of the grooves with which the stylus is employed.

The Fig. 28 embodiment has a true elliptical tip, shown in a 95° groove having a width of .006 inch, depth of .002 inch, and bottom radius of .0023 inch. In this embodiment the cone tip radius in effect increases from the point of tip tangency to the cone to the extreme end of the tip.

Referring to Fig. 28, let $f=\frac{1}{2}$ minor or vertical axis of ellipse, $a=\frac{1}{2}$ major or horizontal axis, $g$=width of cone at plane of truncation or distance between opposed points of tip tangency to ellipse, $m$=slope of cone side, $h$=projection of ellipse beyond plane of truncation.

Then $$f=\frac{h(gm-h)}{gm-2h}$$

and $$a=\frac{\sqrt{g}(gm-h)}{\sqrt{m(gm-2h)}}$$

In the specific example shown, $g$=.0023 inch, $m$=tangent 41°, $h$=.0003 inch, $a$=.00128 inch, and $b$=.00525.

The proof is as follows:

$$\frac{x^2}{a^2}+\frac{(y-f)^2}{f^2}=1$$

At tangent point $$\frac{g^2}{f^2}+\frac{(h-f)^2}{f^2}=1$$

$$x=a\sqrt{1-\frac{(y-f)^2}{f^2}}=\frac{a}{f}\sqrt{2fy-f^2}$$

$$\frac{dx}{dy}=\frac{a}{f}\cdot\frac{f-y}{\sqrt{2fy-y^2}}=\frac{1}{m}$$

$$\frac{dy}{dx}=\frac{f}{a}\cdot\frac{\sqrt{2fy-y^2}}{f-y}=m$$

$$\frac{g^2}{a^2}=\frac{1-h^2-2hf+f^2}{f^2}=\frac{2fh-h^2}{f^2}$$

$$a=\frac{f}{m}\cdot\frac{\sqrt{2fh-h^2}}{f-h}$$

$$a=\frac{fg}{\sqrt{2fh-h^2}}=\frac{f}{m}\cdot\frac{\sqrt{2fh-h^2}}{f-h}$$

$$gm(f-h)=2fh-h^2$$

$$f(gm-2h)=gmh-h^2$$

$$f=\frac{h(gm-h)}{gm-2h}$$

$$a=\frac{fg}{\sqrt{2fh-h^2}}=\frac{\frac{hg(m-h)}{gm-2h}}{\sqrt{\frac{2h^2(gm-h)}{gm-2h}-h^2}}=\frac{\frac{g(gm-h)}{gm-2h}}{\sqrt{\frac{gm}{gm-2h}}}$$

$$a=\sqrt{\frac{g}{m}}\cdot\frac{gm-h}{\sqrt{gm-2h}}$$

With respect to the elliptical type, it will be appreciated that the projection of the ellipse beyond the plane of truncation should be such that the tip clears the bottom of the groove having the largest included angle. The quantity $g$, being the width of the cone at the plane of truncation, should desirably be smaller than the with of the most narrow groove to be encountered in practice.

From the foregoing it will be seen that there have been shown and described several embodiments of a universal reproducing stylus for the reproduction of sound from any one of a plurality of distinct types of record discs having laterally modulated grooves, those types being characterized by grooves of different widths and included angles. Each stylus has a conical groove-contacting portion so formed as to penetrate any one of those grooves. While there have been shown and described what are at present considered to be the preferred embodiments of the invention, it will be apparent to those skilled in the art that various changes, modifications, and substitutions of equivalents may be made without departing from the invention as defined in the appended claims, which define the true scope of the invention.

I claim:

1. A one-piece universal sound-reproducing stylus for use with any of the following types of record discs, having laterally modulated V-shaped grooves terminating in a bottom radius and average dimensions approximately as follows: First, the large-groove type having an 88 degree groove angle, a groove width of 0.006 inch and a bottom radius of 0.0023 inch; second, the fine-groove type having a groove angle of 85 degrees, a groove width of 0.00275 inch and a maximum bottom radius of 0.00025 inch; and third, the fine-groove type having a groove angle of 87 degrees, a groove width of 0.00285 inch and a maximum bottom radius of 0.0002 inch—said stylus comprising: a conical groove-shoulder contacting portion of circular cross section having an included angle greater than the largest included angle of said grooves, and a curved tip portion having a maximum width less than 0.00275 inch.

2. A one-piece universal sound-reproducing stylus for use with any of the following types of record discs, having laterally modulated V-shaped grooves terminating in a bottom radius and average dimensions approximately as follows: First, the large-groove type having an 88 degree groove angle, a groove width of 0.006 inch and a bottom radius of 0.0023 inch; second, the fine-groove type having a groove angle of 85 degrees, a groove width of 0.00275 inch and a maximum bottom radius of 0.00025 inch; and third, the fine-groove type having a groove angle of 87 degrees, a groove width of 0.00285 inch and a maximum bottom radius of 0.0002 inch—said stylus comprising: a groove-shoulder contacting portion of circular cross section formed as a truncated cone having a virtual apex angle greater than the largest included angle of said grooves, and a tip portion formed as a surface of revolution tangent to the surface of said cone, the width of the cone at the points of tangency being less than the narrowest one of said grooves.

3. A one-piece universal sound-reproducing stylus for use with any of the following types of record discs, having laterally modulated V-shaped grooves terminating in a bottom radius and average dimensions approximately as follows: First, the large-groove type having an 88 degree groove angle, a groove width of 0.006 inch and a bottom radius of 0.0023 inch; second, the fine-groove type having a groove angle of 85 degrees, a groove width of 0.00275 inch and a maximum bottom radius of 0.00025 inch; and third, the fine-groove type having a groove angle of 87 degrees, a groove width of 0.00285 inch and a maximum bottom radius of 0.0002 inch—said stylus comprising: a groove-shoulder contacting portion of circular cross section formed as a truncated cone having a virtual vertex angle greater than the largest included angle of said grooves, and a tip portion formed as a surface of revolution tangent to the surface of said cone, the radius of said tip being less than $$\frac{W_s}{2\cos\frac{\theta}{2}}$$

where $W_s$ is the width of the smallest one of said grooves and $\theta$ is said vertex angle.

4. A one-piece universal sound-reproducing stylus for use with any of the following types of record discs, having laterally modulated V-shaped grooves terminating in a bottom radius and average dimensions approximately as follows: First, the large-groove type having an 88 degree groove angle, a groove width of 0.006 inch and a bottom radius of 0.0023 inch; second, the fine-groove type having a groove angle of 85 degrees, a groove width of 0.00275 inch and a maximum bottom radius of 0.00025 inch; and third, the fine-groove type having a groove angle of 87 degrees, a groove width of 0.00285 inch and a maximum bottom radius of 0.0002 inch—said stylus comprising: a groove-shoulder contacting portion formed as a truncated cone of circular cross section having a virtual apex angle greater than the largest included angle of said grooves, and a tip portion formed as a surface of revolution tangent to the surface of said cone, the radius of said tip being less than $$\frac{W_s}{2\cos\frac{\theta}{2}}$$

and greater than $$\left(\frac{W_L}{2\tan\frac{\theta}{2}}-D\right)\left(\frac{\sin\frac{\theta}{2}}{1-\sin\frac{\theta}{2}}\right)$$

where $W_s$ is the width of the smallest one of said grooves, $\theta$ is the apex angle, D is the depth of the groove having the largest included angle, and $W_L$ is the width of the largest one of said grooves.

5. A one-piece universal sound-reproducing stylus for use with any of the following types of record discs, having laterally modulated V-shaped grooves terminating in a bottom radius and average dimensions approximately as follows: First, the large-groove type having an 88 degree groove angle, a groove width of 0.006 inch and a bottom radius of 0.0023 inch; second, the fine-groove type having a groove angle of 85 degrees, a groove width of 0.00275 inch and a maximum bottom radius of 0.00025 inch; and third, the fine-groove type having a groove angle of 87 degrees, a groove width of 0.00285 inch and a maximum bottom radius of 0.0002 inch—said stylus comprising: a groove-shoulder contacting portion formed as a truncated cone of circular cross section having a virtual apex angle greater than the largest included angle of said grooves, and a tip portion formed as a surface of revolution tangent to said cone, the radius of said tip being greater than $$\left(\frac{W_L}{2\tan\frac{\theta}{2}}-D\right)\left(\frac{\sin\frac{\theta}{2}}{1-\sin\frac{\theta}{2}}\right)$$

where $W_L$ is the width of the largest one of said grooves, $\theta$ is the apex angle, and D is the depth of the groove having the largest included angle.

6. A one-piece universal sound-reproducing stylus for use with any of the following types of record discs, having laterally modulated V-shaped grooves terminating in a bottom radius and average dimensions approximately as follows: First, the large-groove type having an 88 degree groove angle, a groove width of 0.006 inch and a bottom radius of 0.0023 inch; second, the fine-groove type having a groove angle of 85 degrees, a groove width of 0.00275 inch and a maximum bottom radius of 0.00025 inch; and third, the fine-groove type having a groove angle of 87 degrees, a groove width of 0.00285 inch and a maximum bottom radius of 0.0002 inch—said stylus comprising: a virtually truncated conical groove-shoulder contacting portion of circular cross section formed with an included angle $\theta$ in excess of twice the angle whose tangent is equal to $$\frac{W_L-t}{2\left(D-r+\sqrt{r^2-\frac{t^2}{4}}\right)}$$

said conical portion terminating in an integral tip which projects beyond the plane of truncation by an amount less than $$D-\frac{W_L-t}{2\tan\frac{\theta}{2}}$$

the width of the cone at the plane of truncation being less than $W_s$, where $W_L$=width of largest-angle groove for which the stylus is designed,
$t$=width of cone at plane of truncation,
$r$=bottom radius of groove having width $W_L$,
$D$=depth of such groove,
$\theta$=cone angle, and
$W_s$=width of narrowest groove for which the stylus is designed, said tip surface being curved and tangent to the surface of said conical portion.

7. A one-piece universal sound-reproducing stylus for use with any of the following types of record discs, having laterally modulated V-shaped grooves terminating in a bottom radius and average dimensions approximately as follows: First, the large-groove type having an 88 degree groove angle, a groove width of 0.006 inch and a bottom radius of 0.0023 inch; second, the fine-groove type having a groove angle of 85 degrees, a groove width of 0.00275 inch and a maximum bottom radius of 0.00025 inch; and third, the fine-groove type having a groove angle of 87 degrees, a groove width of 0.00285 inch and a maximum bottom radius of 0.0002 inch—said stylus comprising: a virtually truncated conical groove-shoulder contacting portion of circular cross section formed with an included angle $\theta$ in excess of twice the angle whose tangent is equal to $$\frac{W_L-t}{2\left(D-r+\sqrt{r^2-\frac{t^2}{4}}\right)}$$

said conical portion terminating in an integral tip which projects beyond the plane of truncation by an amount less than $$D-\frac{W_L-t}{2\tan\frac{\theta}{2}}$$

where $W_L$=width of largest-angle groove for which the stylus is designed,
$t$=width of cone at plane of truncation,
$r$=bottom radius of groove having width $W_L$,
$D$=depth of such groove, and
$\theta$=cone angle, said tip surface being curved and continuous with the surface of said conical portion.

8. A one-piece universal sound-reproducing stylus for use with any of the following types of record discs, having laterally modulated V-shaped grooves terminating in a bottom radius and average dimensions approximately as follows: First, the large-groove type having an 88 degree groove angle, a groove width of 0.006 inch and a bottom radius of 0.0023 inch; second, the fine-groove type having a groove angle of 85 degrees, a groove width of 0.00275 inch and a maximum bottom radius of 0.00025 inch; and third, the fine-groove type having a groove angle of 87 degrees, a groove width of 0.00285 inch and a maximum bottom radius of 0.0002 inch—said stylus comprising: a virtually truncated groove-shoulder contacting conical portion of circular cross section formed with an included angle $\theta$ in excess of twice the angle whose tangent is equal to $$\frac{W_L-t}{2\left(D-r+\sqrt{r^2-\frac{t^2}{4}}\right)}$$

the width of the cone at the plane of truncation being less than $W_s$, where $W_L$=width of largest-angle groove for which the stylus is designed,
$t$=width of cone at plane of truncation,
$D$=depth of such groove,
$r$=bottom radius of groove having width $W_L$,
$\theta$= cone angle, and
$W_s$=width of narrowest groove for which the stylus is designed, said tip surface being curved and continuous with the surface of said conical portion.

9. A one-piece universal sound-reproducing stylus for use with any of the following types of record discs, having laterally modulated V-shaped grooves terminating in a bottom radius and average dimensions approximately as follows: First, the large-groove type having an 88 degree groove angle, a groove width of 0.006 inch and a bottom radius of 0.0023 inch; second, the fine-groove type having a groove angle of 85 degrees, a groove width of 0.00275 inch and a maximum bottom radius of 0.00025 inch; and third, the fine-groove type having a groove angle of 87 degrees, a groove width of 0.00285 inch and a maximum bottom radius of 0.0002 inch—said stylus comprising: a virtually truncated conical groove-shoulder contacting portion of circular cross section formed with an included angle $\theta$ in excess of the included angle of any of said grooves, said conical portion terminating in an integral tip which projects beyond the plane of truncation by an amount less than $$D-\frac{W_L-t}{2\tan\frac{\theta}{2}}$$

where $W_L$=width of largest-angle groove for which the stylus is designed,
$t$=width of cone at plane of truncation,
$D$=depth of such groove, and
$\theta$=cone angle, said tip surface being curved and continuous with the surface of said conical portion.

10. A one-piece universal sound-reproducing stylus for use with any of the following types of record discs, having laterally modulated V-shaped grooves terminating in a bottom radius and average dimensions approximately as follows: First, the large-groove type having an 88 degree groove angle, a groove width of 0.006 inch and a bottom radius of 0.0023 inch; second, the fine-groove type having a groove angle of 85 degrees, a groove width of 0.00275 inch and a maximum bottom radius of 0.00025 inch; and third, the fine-groove type having a groove angle of 87 degrees, a groove width of 0.00285 inch and a maximum bottom radius of 0.0002 inch—said stylus comprising: a virtually truncated conical groove-shoulder contacting portion of circular cross section formed with an included angle $\theta$ in excess of the included angle of any of said grooves, said conical portion terminating in an integral tip which projects beyond the plane of truncation by an amount less than $$D-\frac{W_L-t}{2\tan\frac{\theta}{2}}$$

the width of the cone at the plane of truncation being less than $W_s$, where $W_L$=width of largest-angle groove for which the stylus is designed,
$D$=depth of such groove,
$t$=width of cone at plane of truncation,
$\theta$=cone angle, and
$W_s$=width of narrowest groove for which the stylus is designed, said tip surface being curved and continuous with the surface of said conical portion.

References Cited in the file of this patent

UNITED STATES PATENTS

| Number | Name | Date |
|---|---|---|
| 1,976,560 | Hewitt | Oct. 9, 1934 |
| 2,251,204 | Reid | July 29, 1941 |
| 2,310,049 | Albersheim | Feb. 2, 1943 |
| 2,511,444 | Nichols | June 13, 1950 |
| 2,573,723 | McClain | Nov. 6, 1951 |

FOREIGN PATENTS

| Number | Country | Date |
|---|---|---|
| 352,221 | Great Britain | July 9, 1931 |
| 358,925 | Great Britain | Oct. 7, 1931 |
| 547,712 | Germany | Apr. 4, 1932 |
| 814,894 | France | Mar. 30, 1937 |